US006875964B2

(12) United States Patent
Golovashchenko et al.

(10) Patent No.: US 6,875,964 B2
(45) Date of Patent: Apr. 5, 2005

(54) APPARATUS FOR ELECTROMAGNETIC FORMING, JOINING AND WELDING

(75) Inventors: Sergey Fedorovich Golovashchenko, Beverly Hills, MI (US); Vladimir Vladimirovich Dmitriev, St. Petersburg (RU); Andrew Michael Sherman, Bloomfield, MI (US)

(73) Assignee: Ford Motor Company, Dearborn, MI (US)

( * ) Notice: Subject to any disclaimer, the term of this patent is extended or adjusted under 35 U.S.C. 154(b) by 12 days.

(21) Appl. No.: 10/249,188

(22) Filed: Mar. 20, 2003

(65) Prior Publication Data

US 2003/0209536 A1 Nov. 13, 2003

Related U.S. Application Data

(60) Provisional application No. 60/378,622, filed on May 7, 2002.

(51) Int. Cl.[7] .............................................. B23K 13/01

(52) U.S. Cl. ...................................... 219/603; 219/606

(58) Field of Search ................................ 219/600, 603, 219/666, 607, 608, 602, 633, 765; 156/272; 29/428

(56) References Cited

U.S. PATENT DOCUMENTS 2,542,393 A 2/1951 Chapman
2,649,527 A 8/1953 Chapman et al.
3,007,022 A 10/1961 Jackson et al.
3,088,200 A 5/1963 Birdsall et al.
3,195,335 A 7/1965 Brower et al.
3,383,890 A 5/1968 Wildi
3,430,472 A 3/1969 Furth
3,543,550 A 12/1970 Rose
3,603,759 A 9/1971 Peacock
3,610,007 A 10/1971 Wildi
3,654,787 A 4/1972 Brower
3,676,637 A 7/1972 Anderson
3,704,506 A 12/1972 Orr et al.
3,823,589 A 7/1974 Tikhonovich et al.
3,842,630 A 10/1974 Mikhailov et al.
3,896,647 A 7/1975 Mikhailov et al.
4,129,846 A 12/1978 Yablochnikov
4,143,532 A 3/1979 Khimenko et al.
4,789,094 A 12/1988 Chudakov
4,947,667 A 8/1990 Gunkel et al.
5,442,846 A 8/1995 Snaper
5,813,265 A 9/1998 Shaw et al.
5,824,998 A 10/1998 Livshiz et al.
5,826,230 A 10/1998 Rathke et al.
5,874,713 A * 2/1999 Cydzik et al. .............. 219/633
5,937,496 A 8/1999 Benoit et al.
5,966,813 A 10/1999 Durand
5,981,921 A 11/1999 Yablochnikov
6,014,012 A 1/2000 Murao et al.
6,104,012 A 8/2000 Durand
6,128,935 A 10/2000 Daehn et al.
6,229,125 B1 * 5/2001 Livshiz et al. .............. 219/617
6,234,375 B1 5/2001 Durand
6,255,631 B1 7/2001 Kichline, Jr. et al.
6,274,857 B1 * 8/2001 Loveless et al. ............ 219/639
6,528,771 B1 * 3/2003 Matsen et al. .............. 219/634
6,630,651 B2 * 10/2003 Ohishi et al. ............... 219/662

* cited by examiner

*Primary Examiner*—Daniel Robinson
(74) *Attorney, Agent, or Firm*—Raymond L. Coppiellie

(57) ABSTRACT

There is disclosed herein an apparatus for electromagnetic forming, joining or welding a workpiece, the apparatus including at least two multi-turn solenoid coils wound in a manner that cooperatively encircles the workpiece to be formed. The apparatus also includes an electrically insulative shell encasing each coil and an electromagnetic current source electrically connected to the coils that generates an electromagnetic field. A hinge mechanism connects the insulative shells and a locking mechanism secures the shells and coils around the workpiece during electromagnetic field generation. A conductive rod joins the solenoid coils and permits series current flow between the coils. The apparatus further includes a shaper that encircles the workpiece and which restricts movement of the workpiece during electromagnetic forming. The shaper concentrates the generated electromagnetic field on the workpiece.

24 Claims, 8 Drawing Sheets

APPARATUS FOR ELECTROMAGNETIC FORMING, JOINING AND WELDING

This application claims benefit of 60,378,622 May 7, 2002.

BACKGROUND OF INVENTION

1. Field of the Invention

The present invention relates generally to forming or joining of materials, and more particularly to an apparatus for the electromagnetic forming, joining or welding (EMF) of materials.

2. Description of the Related Art

Electromagnetic forming has long been used as a method of manipulating tubular components. Electromagnetic forming forces one workpiece against another resulting in the welding or joining of the workpieces. A weld occurs when molecular interaction takes place between the two workpieces and they are merged together at the molecular level. Joining occurs where there is no molecular interaction between the two workpieces.

U.S. Pat. Nos. 5,966,813; 6,104,012 and 5,981,921 disclose methods of joining tubular end fittings to drive shafts utilizing EMF. These patents incorporate a coil having individual segments connected in parallel similar to a coil design disclosed in U.S. Pat. No. 4,129,846. The inductance generated with this individual segment coil design requires very high amounts of imputed energy to generate adequately secured joints. The efficiencies of this coil design are insufficient for large-scale production and there is a need in the art for a more effective coil design.

Other designs have attempted to overcome the aforementioned shortcomings by using other coil designs. U.S. Pat. Nos. 3,654,787 and 5,442,846 disclose multi-turn coils adapted to surround tubular components by dividing the cylindrically wound coil to create two symmetrical C-shaped members. The coil can then be opened and clamped around tubular components thereby encircling the workpiece. A limitation of this design is the contact interface between the two coil halves when the electric current is moved through the coil. The high intensity of this current rapidly degrades this interface leading to an inconsistent EMF pressure pulse on the tubular component.

An attempt to resolve interface degradation between the coils is shown in U.S. Pat. No. 6,229,125. In this embodiment two separate single turn coils connected inductively are clamped around the tubular component. Because the current is independently routed through the tubular components there is no interface that the current must negotiate and no concentrated interface degradation. However, because single turn coils are utilized, the electrical efficiency of the overall system is compromised. There exists a need for an multi-coiled electromagnetic forming apparatus that can be opened and closed around tubular components permitting EMF in areas accessible by a clamshell type design.

With EMF, high temperatures can be generated, thus necessitating a need for cooling. U.S. Pat. No. 3,842,630 suggests a method of cooling an electromagnetic forming apparatus by routing coolant through channels machined inside the coil. This approach does not actively cool the tool as the working area of the coil is not in direct contact with the coolant. U.S. Pat. No. 3,195,335 discloses pumping coolant to the turns of an electromagnetic forming coil. This design cannot be effectively utilized to trace all curves of an electromagnetic forming coil without breaking the coolant delivery tubes. There further exists a need to actively cool the EMF permitting higher rates of production without overheating.

SUMMARY OF INVENTION

Accordingly, it is an advantage of the present invention to provide a method of electromagnetic forming that can be opened and closed around tubular components thereby allowing EMF to take place regardless of surrounding componentry.

It is an advantage of the present invention to provide a method of cooling electromagnetic forming coils with a circulating coolant, thus minimizing overheating and long term coil degradation.

It is also an advantage of the present invention to direct the electromagnetic force to predetermined areas of the workpiece using spacers and slots machined therein.

The present invention provides these advantages with an apparatus for electromagnetic forming or joining of a workpiece, the apparatus comprising at least two multi-turn solenoid coils wound in a manner to cooperatively encircle the workpiece; an electrically insulative shell encasing each coil; an electromagnetic forming machine electrically connected to the coils and operative to generate a magnetic field and a device that secures the coil around the workpiece during electromagnetic field generation. The apparatus further comprises a hinge mechanism operative to secure the coils around the workpiece; a locking mechanism operative to fasten the insulative shells around the workpiece; and a conductive rod operative to electrically join the coils. The apparatus further comprises a shaper adapted to encircle the workpiece and operative to restrict movement of the workpiece while concentrating the generated electromagnetic field on the workpiece; multiple points of intersection between shapers coinciding with predetermined areas of the workpiece; and slots machined in the singular or multiple shapers coinciding with predetermined areas of the workpiece thereby lessening the electromagnetic force directed to those areas.

These and other advantages of the present invention will become readily apparent by the drawings, detailed description, and claims that follow.

DETAILED DESCRIPTION

Figure 1:
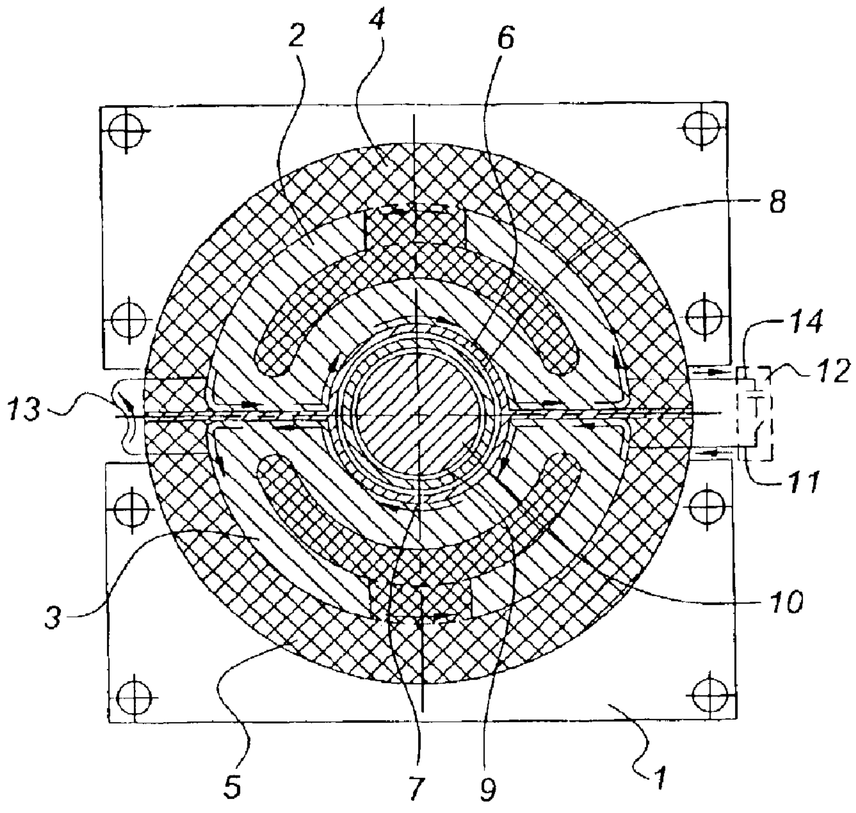
FIG. 1 is a cross-sectional view illustrating the position of a workpiece relative to the apparatus of the present invention.

Referring now to the drawings, FIG. 1 illustrates a cross-sectional, side view of an apparatus for the electromagnetic forming or joining of a workpiece according to the present invention. Generally, electromagnetic forming machines force one workpiece against another workpiece resulting in the forming, joining or welding of the workpieces. A weld occurs when molecular interaction takes place between the two workpieces and they are merged together at the molecular level. Joining occurs where there is no molecular interaction between the two workpieces. "Forming" or "Electromagnetic Forming (EMF)" will be used to describe all such processes herein.

The electromagnetic forming apparatus shown in FIG. 1 includes a frame 1 housing the multi-turn solenoid coils 2 and 3 and their corresponding shells 4 and 5 made from an electrically insulative material. As illustrated, the coils 2 and 3 are positioned in such a way that concave work zones 6 and 7 are formed between the corresponding shells 4 and 5 together forming a closed loop work cavity 8 around a tubular workpiece 9 and mandrel 10. The electric current for the electromagnetic forming operation is transmitted from one pole of the electromagnetic forming apparatus 12 through a current supply 11, through the multi-turn coils 2 and 3, through another current supply 13 and to the other pole 14 of the electromagnetic forming apparatus. The current is passed in series from coil 2 to coil 3 using a flexible electrically conductive rod 13.

Figure 2:
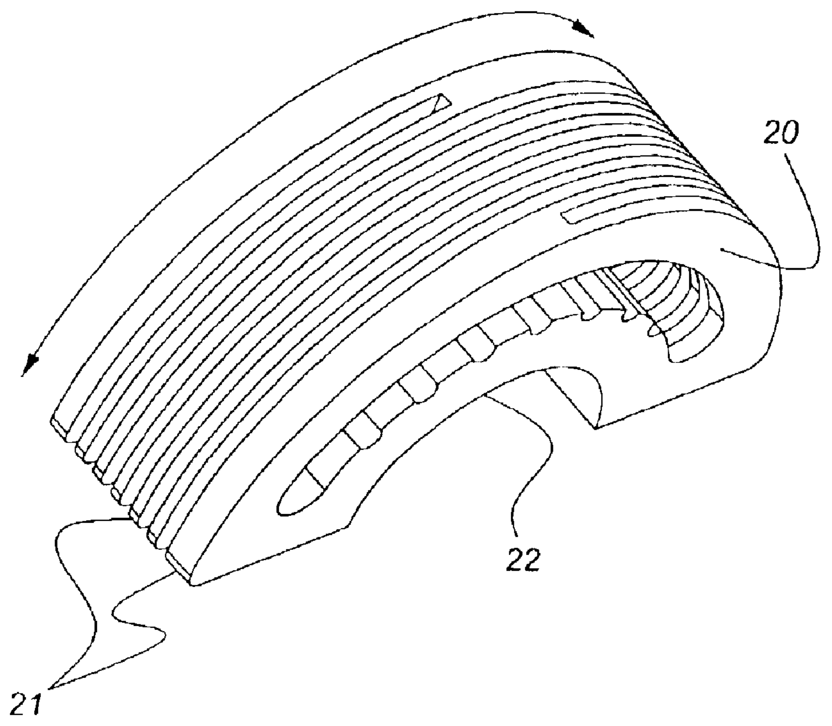
FIG. 2 is an isometric view of a coil for use in the present invention.

FIG. 2 is an isometric view of one half of the electromagnetic forming apparatus. The multi-turn solenoid coil 20 is machined from an electrically conductive material with a high conductive strength such as steel or bronze. The turns of the coil are machined to be thicker in the concave working zone 22 and they include nonlinear exterior surfaces in areas of transition from the outer diameter of the coils to the interface between coils. The direction of the current flow is shown on the coil with arrows with the current creating a closed loop work cavity when paired with the other coil half. This generates EMF pressure, causing the tubular component to compress upon the mandrel.

Figure 3:
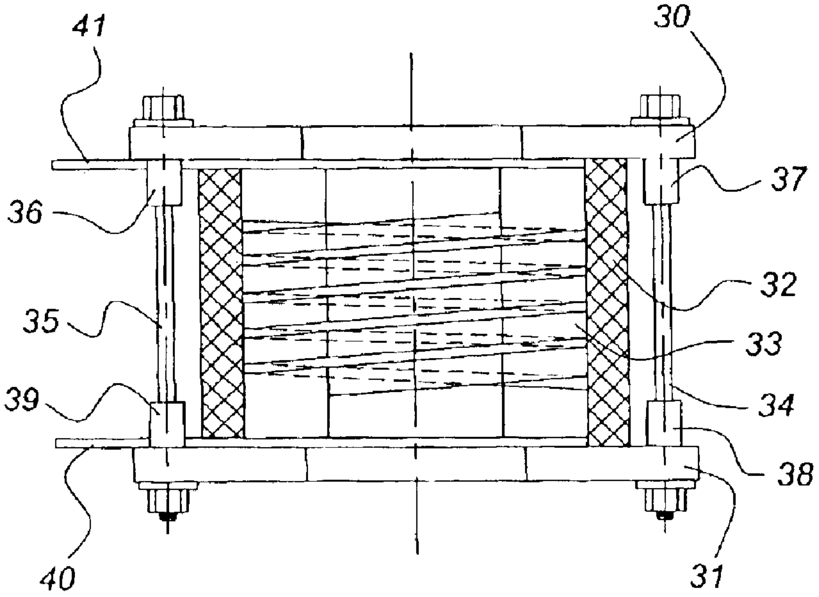
FIG. 3 is a side view of a coil assembly of the apparatus of the present invention.

FIG. 3 shows the positioning of a pair of solid plates 30 and 31 relative to an insulative shell 32. The solid plates 30 and 31 hold the shell 32 and coil 33 in place using fasteners 34 and 35 that pass through bushings 36, 37, 38, and 39 made from electrically insulative material. The electric current loop to and from the EMF machine is connected at points 40 and 41.

Figure 4:
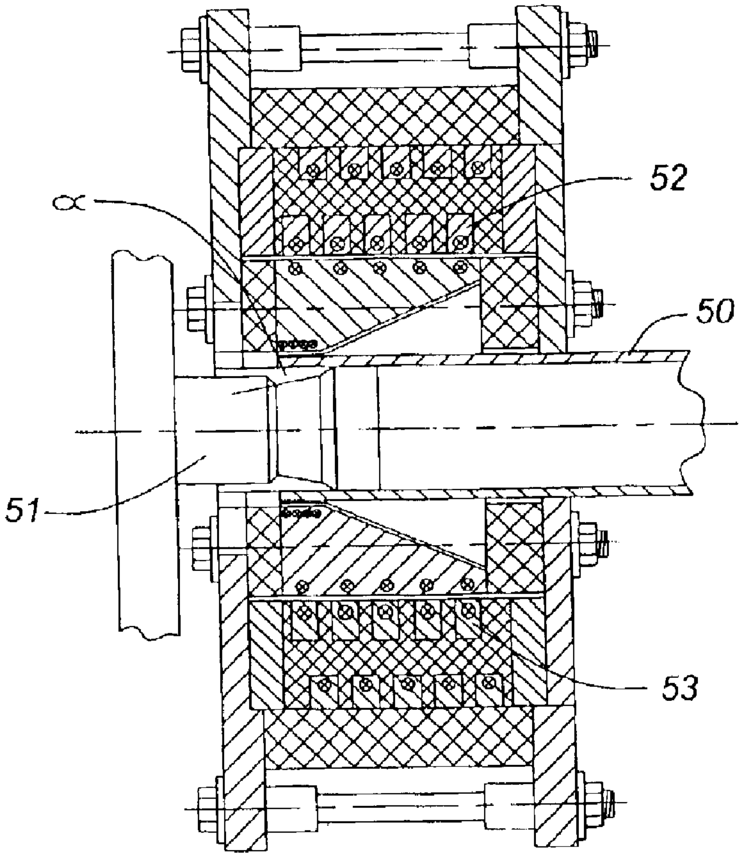
FIG. 4 is a cross-sectional view of a coil for EMF of tubular components to an internal mandrel including two multi-turn solenoid coils with semi-circular EMF shapers according to the present invention.

FIG. 4 shows an initial angle $\alpha$ and the clearance between an inner wall of a component 50 and mandrel 51. Using the apparatus of the present invention in this method, EMF welding takes place by causing molecular interaction between the component 50 and mandrel 51 welding them together. For example, an electric pulse routed through the electromagnetic coils during the forming operation accelerates the tubular component 50 into the mandrel 51 at speeds of 300–500 m/s forming an electromagnetic joint. Depending on the velocity and the specific mandrel design, this may either be a mechanical joint or one that is metallurgically welded. After the operation is completed, the coils 52 and 53 are opened and the apparatus is moved away from the welded part.

Figure 5:
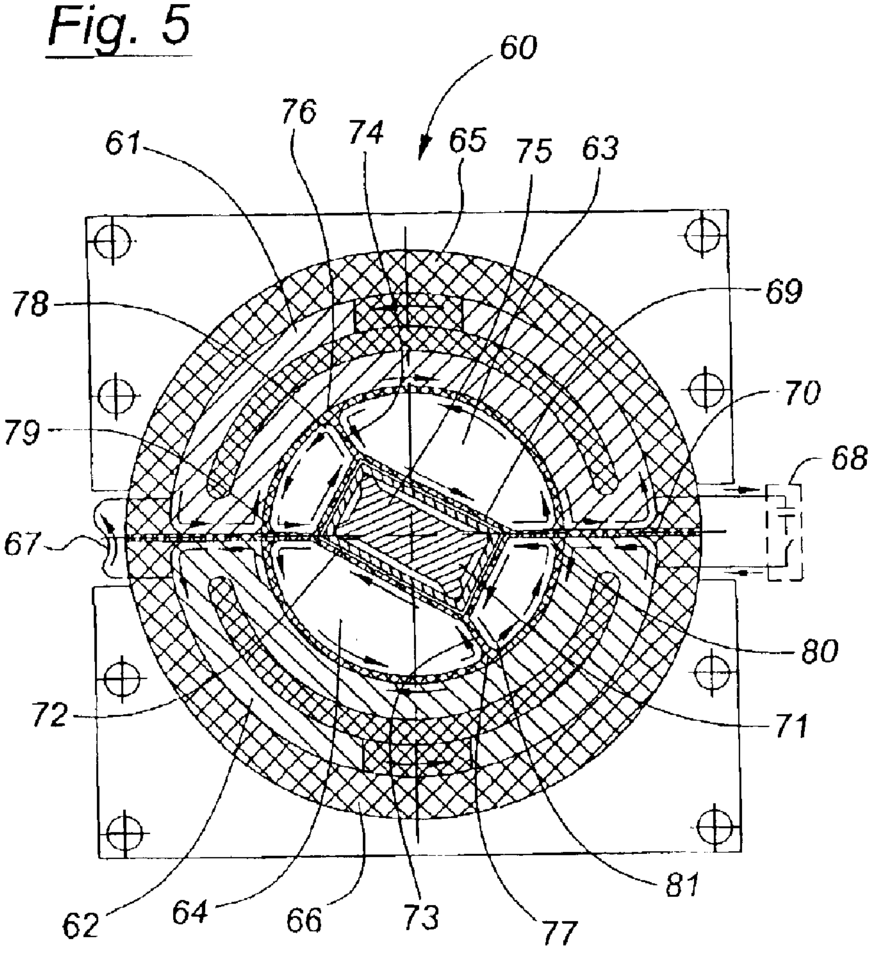
FIG. 5 is a cross-sectional view of a coil for EMF of tubular components to an internal mandrel including two multi-turn solenoid coils and four semi-circular EMF shapers according to the present invention.

FIG. 5 illustrates the utilization of a shaper with the electromagnetic forming apparatus of the present invention. The coil assembly 60 includes multi-turn solenoid coils 61 and 62 surrounding EMF shapers 63 and 64, disposed in insulative shells 65 and 66. Coils 61 and 62 are connected to each other in series by flexible electrically conductive wire 67 and connected by poke 68.

To increase system efficiency and also in cases when joining needs to be done in a narrow zone, electromagnetic field shapers may be employed. The shape of a close-loop inner working cavity 69 is formed by the inner surfaces of the EMF shapers 63 and 64. The working cavity 69 has rectangular shape, corresponding to the cross-section of the tubular component 72 to be formed. An interface plane 70 between the two coils 61 and 62 coincides with diagonal 71 of the rectangular cross-section tubular component 72. Slots 73 and 74 are machined through each of the EMF shapers 63 and 64.:These slots 73 and 74 are positioned to coincide with another diagonal 75 of rectangular cross section of component 72. The slots 73 and 74 contain layers of electrically insulative material 76 and 77. The shapers 63 and 64 are also covered with thin layers of electrically insulative material 76 and 77. To further decrease the inductive resistance of the coil-component system and the dynamic loads on the coil, the corners are rounded in zones 78, 79, 80, and 81 of transaction from the cylindrical outer surface of the EMF shaper to its interface plane and slots. During a joining process, a pulse of electric current from the EMF apparatus runs through the coils 2, 3. In this specific example, the electric current flows along the concave work zones 6,7 in a clockwise direction. This current induces a counter-clockwise current on the outer surfaces of the shapers. As far as the current runs on close loop, it is directed clockwise on the shaper inner surface. The combined current in both inner surfaces of the shapers forms a loop of current around the component 51. It creates EMF pressure in the working cavity between the inner surface of the shapers and the component 51. Under this pressure, the component is compressed on the mandrel.

Joining or welding of structures composed of tubes having faceted cross sections, e.g. rectangles, squares, triangles, etc. may be accomplished by employing shapers having inner configurations consisting of facets matching the facets of the tubes to be joined with one facet per shaper and the number of shapers employed being equal to the number of facets. The EMF coils and shapers are configured in such a way that corners of the tube lie on the interface plane(s) of the coil and shaper segments. For example, for square, rectangular or hexagonal tube cross sections this means that a diagonal of the tube coincides with the interface of the coil and shaper segments. In locations where the corner of the tube does not lie on the interface plane the shaper must have a slot machined through its whole thickness; this slot is filled with insulation material. In order to decrease the inductive resistance and dynamic loads on the system the corners of the shaper should be rounded.

The shape of the mandrel must correspond to the inner shape of the faceted tube. The grooves into which the EMF process will deform the tube must be on the facets of the mandrel but not extend to its corners. Thus, only side flat surfaces are formed in grooves, driven by EMF pressure. The corners of the mandrel act as ribs, which exclude the corners of the tube from the deformation process. These provide the joint with axial, bending and twisting carrying capacity.

Figure 6:
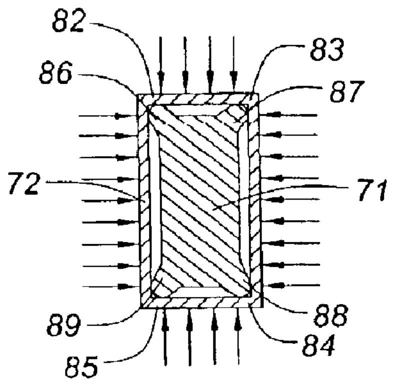
FIG. 6 is an end view of a rectangular tube and mandrel showing grooves in the mandrel facets and the distribution of the generated electromagnetic field on the outer surface of the tube during the forming in accordance with the present invention.

The EMF pressure distribution, shown in FIG. 6, demonstrates that only slight pressure is applied to the corners of the rectangular component 72 when utilizing the shapers 63 and 64.

Figure 7:
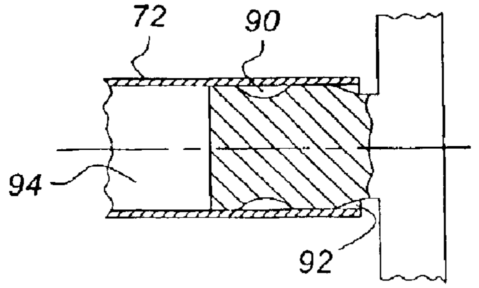
FIG. 7 is a cross-sectional view of a tube and mandrel before EMF compression according to the present invention.
Figure 8:
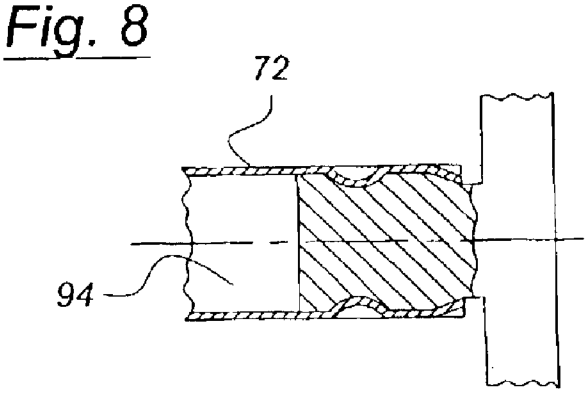
FIG. 8 is a cross-sectional view of a tube and mandrel after the EMF compression according to the present invention.

The slots 73 and 74 and the interface plane 70 (FIG. 5) are positioned to coincide with the corners 82, 83, 84, and 85 of the rectangular cross-section of the component 72. Ribs 86, 87, 88, and 89 are left on the mandrel surface and correspond to corners 82, 83, 84, and 85 of the component 72. FIGS. 7 and 8 illustrate that under this pressure the component 72 is pressed into grooves 90, 92, on the surface of the rectangular mandrel 94. The grooves 90, 92 on the mandrel 94 surface are designed to provide the full contact of the tubular component 72 and the mandrel after the EMF process and to maintain the integrity of the joint when axial, bending, or twisting forces are applied. Only the side flat surfaces of component 72 are formed into the grooves and the ribs 86, 87, 88, and 89 are excluded from the deformation process. A cross-sectional view of the component 72 after the deformation is shown in FIG. 8.

Figure 9:
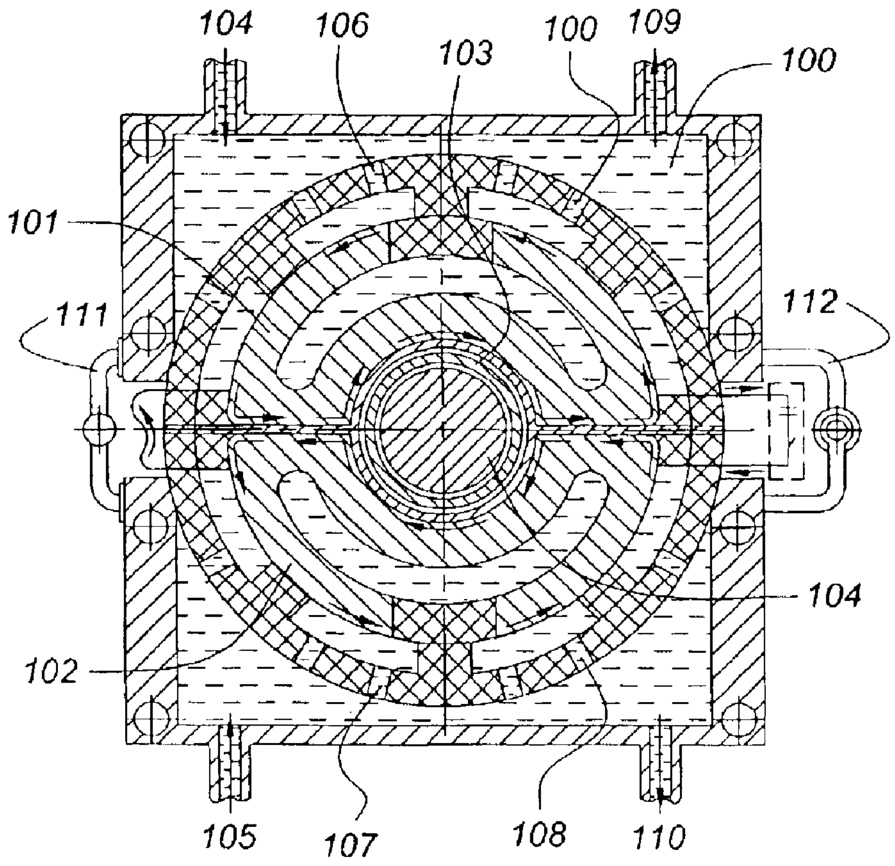
FIG. 9 is a cross-sectional view of the apparatus for EMF illustrating coolant flow and a mechanism for opening and closing the apparatus according to the present invention.

FIG. 9 illustrates the use of coolant 100 to disperse the heat generated during EMF. The coolant may be a gaseous or a liquid variety similar to the liquid coolants widely used in other forming operations. In an apparatus for electromagnetic forming, the coils 101 and 102 are the most loaded elements. They are subjected to mechanical and thermal loads both of which negatively affect their durability and efficiency. Elevated coil temperatures also result in increased electrical resistance and a skin layer growth, similar to the effects of increasing the radial clearance between the coil and the blank being formed. Elevated coil temperatures decrease the amount of electromagnetic force imparted on the workpiece and multiple thermal cycles can result in micro cracks in the working zone of the coil and higher electrical resistance.

To lessen the negative effects of heat build up in coils 101 and 102, coolant 100 is cycled into the assembly at 104 and 105. The coolant 100 then enters the electrically insulative shells as shown at inlets 106 and 107. The coolant 100 submerges the coils 101 and 102 providing maximum cooling benefits to the coils. The coolant 100 exits the insulative shells through outlets 108. The coolant 100 leaves the assembly-through outlets 109 and 110.

FIG. 9 also illustrates the incorporation of a hinge 111 and locking mechanism 112 to secure the two halves of the assembly 103 together during the forming operation. Because of the substantial electromagnetic forces generated, consideration has to be taken to hold the two half of the apparatus together during forming. The hinge 111 is actuated so that it can open and close around the tubular component 103 and the mandrel 104. High volume production also requires rapid opening and closing of the assembly enabling rapid formed part removal. Such actuation of the hinge 111 can be accomplished utilizing solenoids on each half of the apparatus. Solenoids can also be utilized to actuate the locking mechanism 112 further securing the assembly 103 around the tubular component 103. Another solution for high volume removal of formed components would be the use of a robotic system. In this system, a row of hinge pins would be inserted or withdrawn into rows of interlocking knuckles on each side of the coil segments. These hinge pins could be activated and withdrawn automatically with solenoid mechanisms. A completely automated joining operation would then include the following: robotically position coil segments around the tube to be joined; activate hinge pin solenoids to lock segments in place; discharge EMF machine to form a joint; retract hinge pins to unlock the coil segments; and robotically remove the coil segments.

It will be realized, however, that the foregoing specific embodiments have been shown and described for the purposes of illustrating the functional and structural principles of the invention and is subject to change without departure from such principles. Therefore, this invention includes all modifications encompassed within the scope of the following claims.

What is claimed is:

1. An apparatus for electromagnetic forming or joining a workpiece around a mandrel, said apparatus comprising:

at least two multi-turn solenoid coils wound in a manner that cooperatively encircles the workpiece;

an electrically insulative shell encasing each coil;

an electromagnetic current source connected to the coils and operative to generate an electromagnetic field; and a device operative to secure said coils around the workpiece during electromagnetic field generation.

2. An apparatus as defined in claim 1, further comprising a hinge mechanism connecting said insulative shells.

3. An apparatus as defined in claim 2, wherein said hinge mechanism is operative to permit movement of the insulative shells between a C-shaped open position and a closed position.

4. An apparatus as defined in claim 1, wherein said device operative to secure said coils further comprises a locking mechanism disposed on the insulative shells operative to fasten the insulative shells when hinged in a closed position.

5. An apparatus as defined in claim 1, further comprising a conductive rod operative to electrically join said solenoid coils and permit series current flow between said coils.

6. An apparatus as defined in claim 1, further comprising a shaper adapted to encircle said workpiece, said shaper being operative to restrict movement of said workpiece during electromagnetic forming and to concentrate the generated electromagnetic field on the workpiece.

7. An apparatus as defined in claim 6, wherein said shaper comprises a plurality of members, each member being disposed adjacent another and having insulative material between said members.

8. An apparatus as defined in claim 6, wherein slots are formed in said shaper, the slots coinciding with predetermined areas of the workpiece.

9. An apparatus as defined in claim 1, wherein said multi-turn solenoid coils are connected to two or more electromagnetic current sources.

10. An apparatus as defined in claim 1, wherein said multi-turn solenoid coils include non-linear exterior surfaces.

11. An apparatus as defined in claim 10, wherein said multi-turn solenoid coils include a predetermined radius of curvature in areas of transition from an outer diameter of the coils to an interface between coils.

12. An apparatus as defined in claim 1, wherein the electrically insulative shells are filled with a circulating liquid coolant.

13. An apparatus as defined in claim 1, wherein the electrically insulative shells are filled with a circulating gaseous coolant.

14. An apparatus for electromagnetic forming or joining a workpiece around a mandrel, said apparatus comprising:

at least two multi-turn solenoid coils wound in a manner that cooperatively encircles the workpiece;

an electrically insulative shell encasing each coil;

an electromagnetic current source electrically connected to the coils and operative to generate an electromagnetic field;

a hinge mechanism connecting said insulative shells;

a locking mechanism operative to secure said coils around the workpiece during electromagnetic field generation; and a conductive rod joining said solenoid coils and permitting series current flow between said coils.

15. An apparatus as defined in claim 14, wherein said hinge mechanism is operative to permit movement of the insulative shells between a C-shaped open position and an 0-shaped closed position.

16. An apparatus as defined in claim 14, further comprising a shaper adapted to encircle said workpiece, said shaper being operative to restrict movement of said workpiece during electromagnetic forming and to concentrate the generated electromagnetic field on the workpiece.

17. An apparatus as defined in claim 16, wherein said shaper comprises a plurality of members, each member being disposed adjacent another and having insulative material therebetween.

18. An apparatus as defined in claim 16, wherein slots are machined in said shaper, the slots coinciding with predetermined areas of the workpiece.

19. An apparatus as defined in claim 14, wherein said multi-turn solenoid coils are connected to two or more electromagnetic current sources.

20. An apparatus as defined in claim 14, wherein an exterior surface of the multi-turn solenoid coils includes a predetermined radius of curvature.

21. An apparatus as defined in claim 20, wherein said multi-turn solenoid coils include non-linear exterior surfaces in areas of transition from an outer diameter of the coils to an interface between coils.

22. An apparatus as defined in claim 14, wherein the electrically insulative shells are filled with a circulating liquid coolant.

23. An apparatus as defined in claim 14, wherein the electrically insulative shells are filled with a circulating gaseous coolant.

24. An apparatus for electromagnetic welding a workpiece to a second component, said apparatus comprising:

at least two multi-turn solenoid coils wound in a manner that cooperatively encircles the workpiece constructed to include a predetermined radius of curvature in areas of transition from an outer diameter of the coils to an interface between coils;

an electrically insulative shell encasing each coil and filled with a circulating liquid coolant;

an electromagnetic current source electrically connected to the coils and operative to generate an electromagnetic field;

a locking mechanism operative to secure said coils around the workpiece during said electromagnetic field generation.

a hinge mechanism operative to permit movement of the insulative shells between a C-shaped open position and an 0-shaped closed position;

a conductive rod joining said solenoid coils and permitting series current flow between said coils; and a shaper adapted to encircle said workpiece, wherein said shaper comprises a plurality of members, each being disposed adjacent one another and having insulative material therebetween.

* * * * *